United States Patent
Wang et al.

(10) Patent No.: US 8,391,426 B2
(45) Date of Patent: Mar. 5, 2013

(54) BROADBAND PHASE SYNTHESIS NETWORK WITH SELF-HEALING CAPABILITY

(75) Inventors: Hua Wang, Hillsboro, OR (US); Seyed Ali Hajimiri, La Canada, CA (US)

(73) Assignee: California Institute of Technology, Pasadena, CA (US)

(*) Notice: Subject to any disclaimer, the term of this patent is extended or adjusted under 35 U.S.C. 154(b) by 302 days.

(21) Appl. No.: 12/949,679

(22) Filed: Nov. 18, 2010

(65) Prior Publication Data

US 2012/0155580 A1    Jun. 21, 2012

(51) Int. Cl.
*H04L 20/00* (2006.01)
(52) U.S. Cl. .......................................... 375/344
(58) Field of Classification Search ............. 375/344, 375/325, 328, 349
See application file for complete search history.

(56) References Cited

U.S. PATENT DOCUMENTS 5,732,111 A * 3/1998 Walley ..................... 375/344

OTHER PUBLICATIONS

H. Wang and A. Hajimiri, "A wideband CMOS linear digital phase rotator," Proc. IEEE CICC, Sep. 2007, pp. 671-674.

* cited by examiner

*Primary Examiner* — Kevin Kim
(74) *Attorney, Agent, or Firm* — Milstein Zhang & Wu LLC; Joseph B. Milstein

(57) ABSTRACT

A phase synthesis network having self healing capability. The phase synthesis network includes two phase rotators that receive I and Q input LO signals, that receive a digital control signal, and that can adjust a phase and a gain in response to the digital control signal. An output of each of the phase rotators provides a respective output signal to a switch. The switch provides a selected one of the respective output signals for mixing with a predetermined one of the respective output signals. Two mixers mix signals from the phase rotators with an RF signal. Two analog-to-digital converters provide a respective digital signal representative of the output of the mixers. A baseband digital processor generates digital control signals that are provided to the phase rotators. The circuit has an output terminal configured to provide an output signal representative of the RF signal.

17 Claims, 19 Drawing Sheets

$$\theta_1 = \operatorname{asin}\left(\frac{-(\text{②}+\text{③})}{2\cdot\text{①}}\right)$$

$$\theta_2 = \operatorname{atan}\left(\frac{(\text{③}-\text{②})}{2\cdot\text{①}\cdot\cos(\theta_1)}\right)$$

BROADBAND PHASE SYNTHESIS NETWORK WITH SELF-HEALING CAPABILITY

STATEMENT REGARDING FEDERALLY FUNDED RESEARCH OR DEVELOPMENT

The U.S. Government has certain rights in this invention pursuant to Grant No. FA8650-09-C-7925 awarded by DARPA.

CROSS-REFERENCE TO RELATED APPLICATIONS

This application claims priority to and the benefit of U.S. provisional patent application Ser. No. 61/262,490 filed Nov. 18, 2009, which application is incorporated herein by reference in its entirety. This application is related to U.S. patent application Ser. No. 12/949,719, filed Nov. 18, 2010, U.S. patent application Ser. No. 12/806,906, filed Aug. 24, 2010, entitled ELECTRONIC SELF-HEALING METHODS FOR RADIO-FREQUENCY RECEIVERS, and U.S. patent application, Ser. No. 12/877,743, filed Sep. 8, 2010, entitled SELF-HEALING TECHNIQUE FOR HIGH FREQUENCY CIRCUITS. All of the above enumerated applications are incorporated herein by reference in their entirety for all purposes.

FIELD OF THE INVENTION

The invention relates to RF circuitry in general and particularly to a self healing RF circuit that employs a phase synthesis network for improving circuit performance.

BACKGROUND OF THE INVENTION

With scaling to the nanometer regime and improvements in trans-conductance and parasitics, many sophisticated integrated systems can now be implemented in CMOS. However, as feature sizes shrink, new challenges arise, as process, voltage, and temperature (PVT) variations grow larger and more difficult to control. For instance, the small number of dopants in the channel becomes an important source of randomness, rendering traditional techniques (e.g., common-centroid or interdigitated designs) ineffective. From an RF system perspective, such variations can be detrimental since parameters such as gain, phase balance, and common-mode rejection are not well controlled.

Process variations in the fabrication of integrated circuits lead to variations in the operating parameters or characteristics exhibited by multiple exemplars of the same circuit or device, including those made on the same fabrication line. These variations can result in divergent operation of what should be identical devices. One problem that this can create is the necessity to "trim" or adjust circuits to achieve acceptable operation. In the worst of cases, the variation can result in the need to reject or to discard chips that fall outside a desired operational envelope.

In addition, the operational parameters or characteristics exhibited by any one exemplar of a circuit or device can change as the circuit or device ages, as operating conditions such as ambient or operating temperature vary, or as external operating parameters such as supply voltage vary. The operational parameters or characteristics can in various embodiments be dependent on frequency.

A 10 bit phase rotator that can be used as a component has been described in H. Wang and A. Hajimiri, "A wideband CMOS linear digital phase rotator," in Proc. IEEE CICC, Sep. 2007, pp. 671-674. This paper discusses in some detail the issues of phase and amplitude variation.

There are prior art devices that attempt to perform self healing using an applied signal of interest.

There is a need for systems and methods that allow circuits and devices that exhibit divergent operating parameters or characteristics to "self heal" or to self correct when varying operating parameters or characteristics are present.

SUMMARY OF THE INVENTION

According to one aspect, the invention features a phase synthesis network having self healing capability. The phase synthesis network comprises two input terminals configured to receive respectively a first signal representative of an in-phase signal and a second signal representative of a quadrature signal; two phase rotators, each configured to receive a respective one of the first signal and the second signal from the input terminals, each of the phase rotators having an input configured to receive a digital control signal, and configured to adjust a phase and a gain of the phase rotator in response to the digital control signal, each of the phase rotators having an output terminal configured to provide a respective output signal; a switch configured to receive each of the respective output signals from the phase rotators and configured to provide at an output terminal a selected one of the respective output signals as output for mixing with a predetermined one of the respective output signals; two mixers, each configured to receive a signal from a respective one of the output terminals of the phase rotators, each configured to receive an RF signal, each configured to receive an output signal from the output terminal of the switch, each configured to mix the received signals, and each having an output terminal configured to provide a mixed output signal; two analog-to-digital converters, each analog-to-digital converter configured to receive a respective one of the mixed output signal and to provide a respective digital signal in response thereto; a baseband digital processor configured to receive the two digital signals from the two analog-to-digital converters, and to generate a respective digital control signal, the digital control signals provided as control signals to a respective one of the phase rotator input configured to receive the digital control signal; and at least one output terminal configured to provide an output signal representative of the RF signal.

In one embodiment, the at least one of the phase rotators is a 10-bit phase rotator.

In another embodiment, the at least one of the phase rotators comprises a Cherry-Hooper active load.

In yet another embodiment, the at least one of the phase rotators comprises an auxiliary BitO configured to allow a true zero to be set.

In still another embodiment, the switch is a 2:1 multiplexer.

In a further embodiment, the at least one of the two mixers comprises a Gilbert cell.

In yet a further embodiment, the at least one of the two mixers comprises two matched RF paths.

In an additional embodiment, the phase synthesis network further comprises a memory configured to contain a lookup table.

In yet an additional embodiment, the phase synthesis network further comprises at least one limiter configured to control an amplitude of an output signal of one of the two phase rotators to match an amplitude of an output signal of the other of the two phase rotators.

According to another aspect, the invention relates to a method of self-healing a radio-frequency circuit. The method comprises the step of providing a phase synthesis network having self healing capability, the phase synthesis network in electrical communication with a radio-frequency circuit of interest, the phase synthesis network comprising: two input terminals configured to receive respectively a first signal representative of an in-phase signal and a second signal representative of a quadrature signal; two phase rotators, each configured to receive a respective one of the first signal and the second signal from the input terminals, each of the phase rotators having an input configured to receive a digital control signal, and configured to adjust a phase and a gain of the phase rotator in response to the digital control signal, each of the phase rotators having an output terminal configured to provide a respective output signal; a switch configured to receive each of the respective output signals from the phase rotators and configured to provide at an output terminal a selected one of the respective output signals as output for mixing with a predetermined one of the respective output signals; two mixers, each configured to receive a signal from a respective one of the output terminals of the phase rotators, each configured to receive an RF signal, each configured to receive an output signal from the output terminal of the switch, each configured to mix the received signals, and each having an output terminal configured to provide a mixed output signal; two analog-to-digital converters, each analog-to-digital converter configured to receive a respective one of the mixed output signal and to provide a respective digital signal in response thereto; a baseband digital processor configured to receive the two digital signals from the two analog-to-digital converters, and to generate a respective digital control signal, the digital control signals provided as control signals to a respective one of the phase rotator input configured to receive the digital control signal; and at least one output terminal configured to provide an output signal representative of the RF signal. The method includes the steps of ; observing a response of the phase synthesis network to an input signal; extracting one or more operational parameters of the phase synthesis network; calculating a corrective action to bring one or more operational parameters of the phase synthesis network within a desired range, and recording the corrective action in a memory; and applying the calculated corrective action to the phase synthesis network so as to self-heal at least one of the one or more operational parameters of the phase synthesis network.

In one embodiment, the method of self-healing a radio-frequency circuit further comprises the step of checking at least one operational parameter of the phase synthesis network after the calculated corrective action is applied.

In another embodiment, the steps of extracting one or more operational parameters of the phase synthesis network, calculating a corrective action, and applying the calculated corrective action are repeated iteratively.

In yet another embodiment, the input signal is a signal having a first signal representative of an in-phase signal and a second signal representative of a quadrature signal.

In still another embodiment, the step of extracting one or more operational parameters of the phase synthesis network comprises extracting a selected one of a phase mismatch and a delay mismatch.

In a further embodiment, the step of calculating a corrective action comprises calculating a digital signal configured to adjust an operating parameter of a respective one of the two phase rotators.

In yet a further embodiment, the step of recording the corrective action in a memory comprises building a lookup table.

In an additional embodiment, the step of applying the calculated corrective action to the phase synthesis network comprises setting the operation of a respective one of the two phase rotators by providing the digital control signal to the respective input configured to receive the digital control signal.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

We will describe the systems and methods of the invention as reduced to practice in a RF receiver chip. An advantage of the present systems and methods over the prior art is that the present systems use self-mixing as will be described. While the invention is so described, it is to be recognized that it can also be applied in other embodiments. In the present embodiment, the RF receiver can be used using one transmission frequency or multiple transmission frequencies. With a similarly self-healing transmitter, one can implement half-duplex operation (using one frequency), full duplex operation (for example, using two frequencies) and other modes of communication, such as frequency hopping operation using a plurality of frequencies, commonly using more than two frequencies.

The description of the systems and the associated methods will be provided using a single frequency $\omega$. The systems and methods are used to determine distortions as a function of frequency that arise from imbalances between I and Q components of a signal, and from mismatches in the I and Q signal processing elements or paths. Once the distortions are deduced, or a calibration of a circuit or a device is obtained, the required corrections can be applied to reduce or eliminate the distortions (e.g., to perform "self healing").

It should be understood that the same systems and methods can operate with multiple frequencies $\omega_1, \omega_2, \ldots \omega_N$. In order to provide self healing under multiple frequency operation, one performs the procedures that will be described for one frequency $\omega$ iteratively for each of the two or more frequencies of interest $\omega_1, \omega_2, \ldots, \omega_N$.

Figure 1:
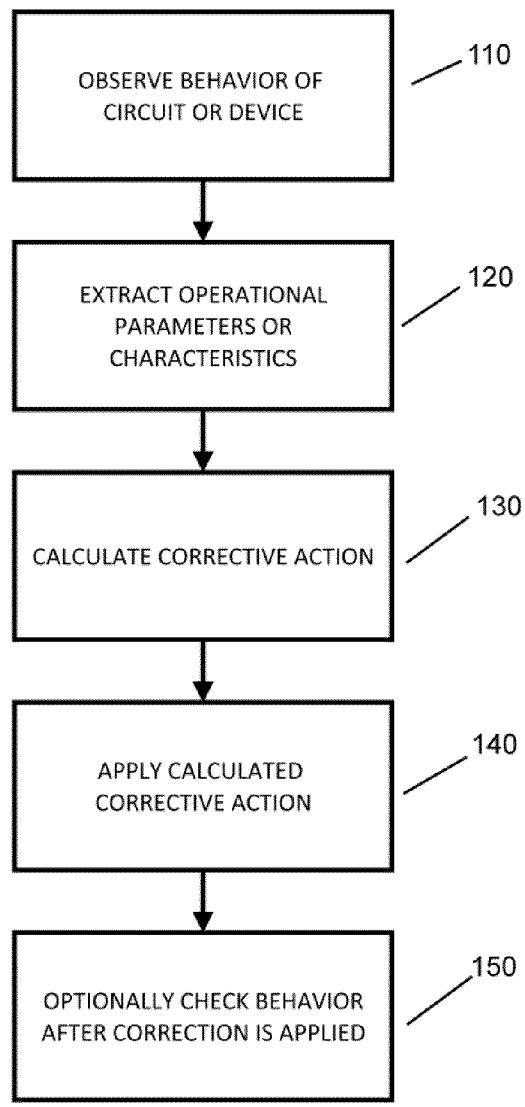
FIG. 1 is a schematic flow chart showing the overall system and process for a self-healing circuit or device.

FIG. 1 shows an exemplary schematic flow chart 100 of the overall system and process for a self-healing circuit or device. As illustrated in FIG. 1, at step 110, the behavior of a circuit or a device in response to an input signal is observed. In some embodiments, the input signal is a test signal or a pre-defined signal. This observation can be performed by components on the chip, or by components off the chip. At step 120, one extracts or derives one or more operational parameters or characteristics of the circuit or the device. At step 130, one calculates a corrective action, if needed, to bring the operational parameters or characteristics of the circuit or device within a desired range. The corrective action can be one or both of the application of a correction signal and a modification of one or more parameters or characteristics of an element in the circuit. At step 140, one applies the calculated corrective action, if needed, to bring the operational parameters or characteristics of the circuit or device within the desired range. Optionally, at step 150, one checks the operational parameters or characteristics of the circuit or the device after the correction is effectuated. In some embodiments, steps 120, 130, 140 and 150 can be repeated if it is determined that the one or more operational parameters or characteristics of the circuit or the device after the correction has been applied are still not within the desired range.

Turning now specifically to complex conversion gain in RF/analog circuitry, we describe hereinbelow embodiments of on-chip methods, architectures, and circuits suitable for automatic calibration of full complex conversion gain (both amplitude and phase). Such techniques are believed suitable for use in most generic tunable broadband RF systems.

Figure 2:
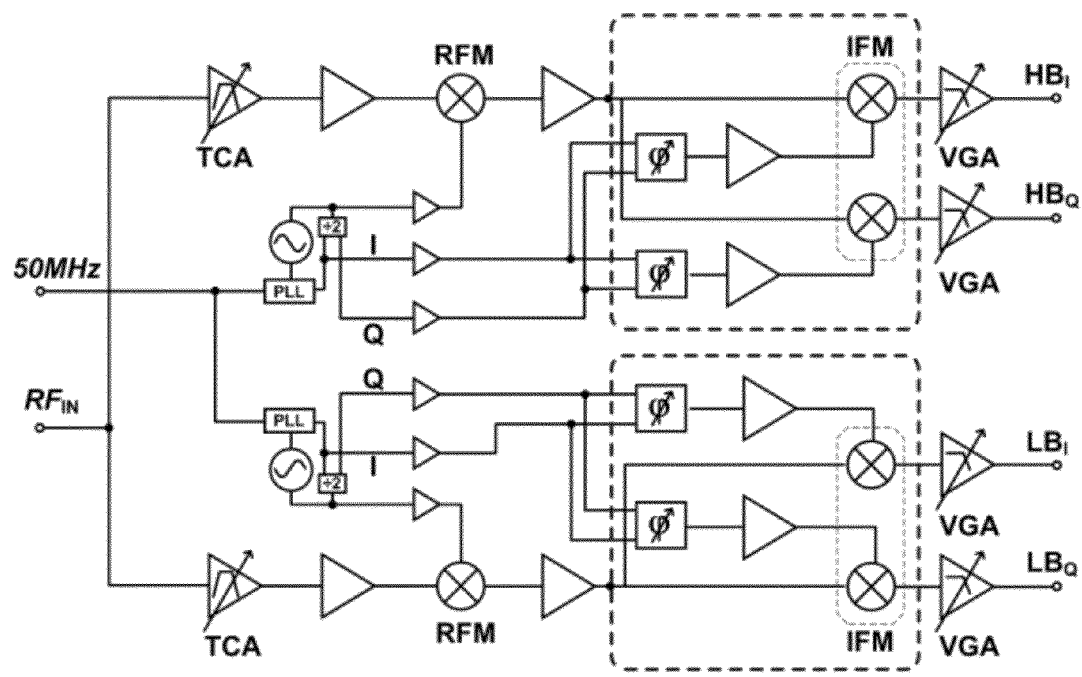
FIG. 2 shows a block diagram of one exemplary embodiment of a dual-band concurrent receiver system using an integrated RF device according to the invention.

We begin with an implementation example, a GHz frequency phased array receiver element implemented in a 65 nm low-power CMOS device. This phased array receiver element performs a self-correction of the errors in both gain flatness and phase accuracy. FIG. 2 shows a block diagram of the receiver system used to demonstrate these automatic gain and phase correction schemes. The exemplary down-conversation scheme uses a dual-band concurrent super-heterodyne downconverter, complete with two independent phase-locked loops and baseband phase rotators to allow for beam-forming of multiple elements. The receiver system uses LO phase shifting architecture. As will become apparent, in the systems and methods of the invention, a phase interpolator shifts the LO phase which leads to baseband (BB) phase shifting.

Figure 3:
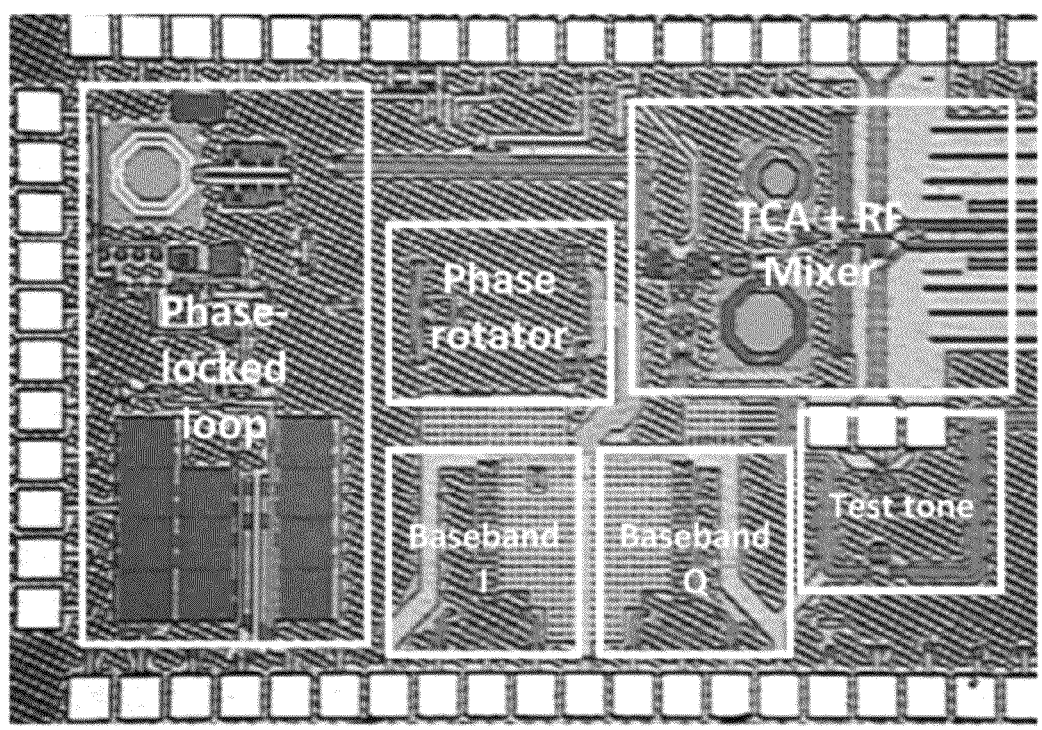
FIG. 3 is a diagram that shows a chip micrograph of one exemplary integrated RF device according to FIG. 2.

FIG. 3 is a diagram that shows a chip micrograph of one exemplary integrated RF device according to FIG. 2. The chip measures 3.8×1.5 mm$^2$ The area overhead for the phase and gain autonomous correction is under 5%.

Figure 4:
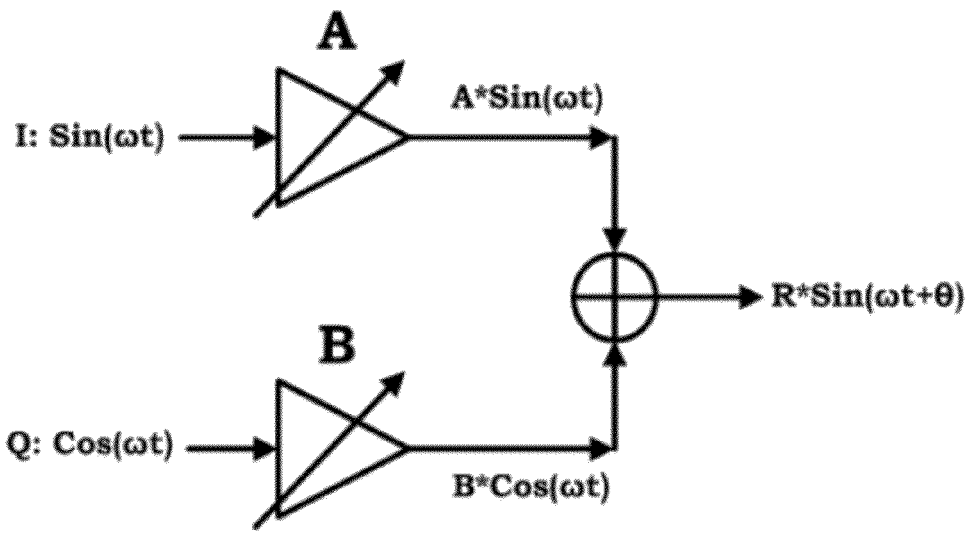
FIG. 4 is a schematic diagram of a phase rotator according to principles of the invention.
Figure 5:
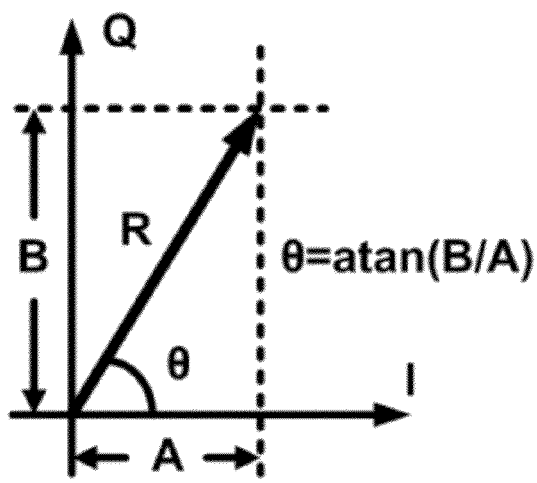
FIG. 5 is a diagram that shows the relationships among I, Q and $R \sin(\omega t + \theta)$.

FIG. 4 is a schematic diagram of a phase rotator, in which the I component is represented as A sin($\omega$t) and the Q component is represented as Bcos($\omega$t). The phase rotator provides a resulting signal represented as R sin($\omega$t+$\theta$). FIG. 5 is a diagram that shows the relationships among I, Q and R sin ($\omega$t+$\theta$).

The variable gain amplifier (VGA) design provides the advantages of a high-resolution interpolation in broadband (e.g., independent of operating frequency), process, voltage and temperature (PVT) insensitive performance, and circuitry that is easily scalable to higher resolution.

Figure 6:
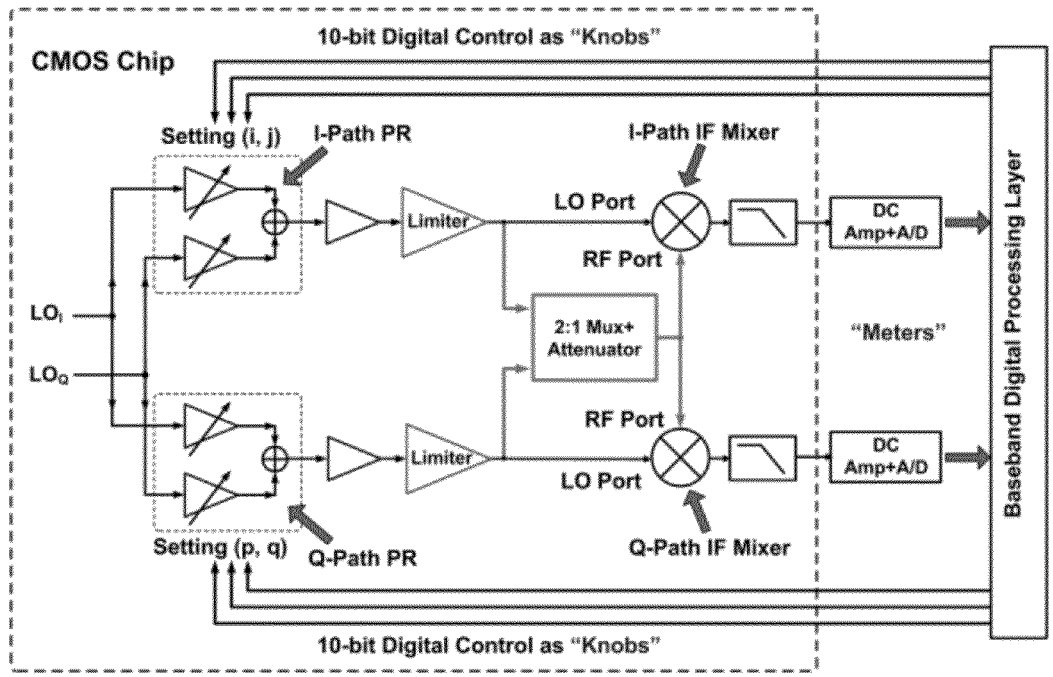
FIG. 6 is a schematic diagram that shows a phase synthesis network having a programmable 10-bit interpolating phase rotator that provides the phase shifting in the LO signal.

FIG. 6 is a schematic diagram that shows a phase synthesis network having a programmable 10-bit interpolating phase rotator that provides the phase shifting in the LO signal. IQ phase and amplitude imbalances due to the inevitable PVT variations and random mismatches in the divider, LO distribution and interpolating VGAs can significantly degrade the phase shifting accuracy. To address these impediments a phase auto-correction scheme has been devised and implemented in the phase synthesis block with no need for any external RF input signal. The scheme includes two steps: a calibration procedure to estimate or deduce the IQ mismatch, and a measurement procedure to determine the phase for each interpolator setting.

Figure 7:
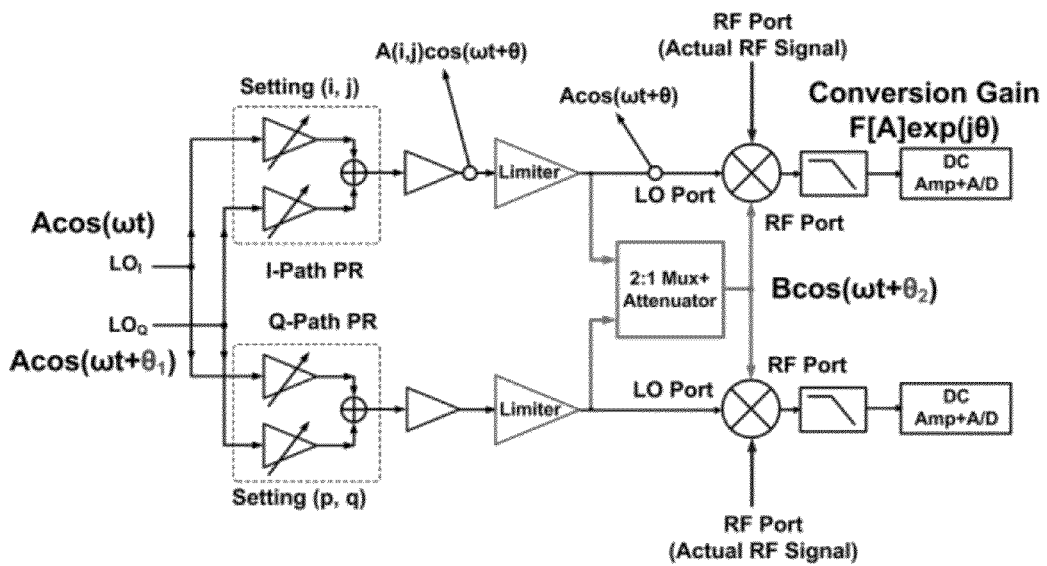
FIG. 7 is a schematic diagram that illustrates how the phase sensing process works.

FIG. 7 is a schematic diagram that illustrates how the phase sensing process works. The I (in-phase) and Q (quadrature) signals are provided to respective phase rotators, which are set using respective variables (i,j) and (p,q) as shown. While the I and Q signals are nominally separated by a phase angle of 90°, so that they are orthogonal, in real systems the phase angle separation may depart from 90°. In the present discussion, the I and Q signal are to be understood as two signals, a first signal representative of the I signal and a second signal representative of the Q signal, such that the first signal and the second signal have a phase angle difference that can be equal to 90°, greater than 90°, or less than 90°. In some embodiments, phase angle differences of 90°±10° between the first signal and the second signal can be successfully accommodated. It is believed that even larger phase angle deviations from 90° can be accommodated. The IF mixer that will handle the RF signal is used so that the complex conversion gain can be targeted. The strategy for phase sensing in the self-healing circuit is that one first characterizes the I/Q phase imbalance ($\theta_1$) and the physical delay ($\theta_2$), and then subtracts them out in the full phase shifting calibration. A three-step procedure is used to characterize $\theta_1$ and $\theta_2$.

The conventional phase interpolation based on the in-phase and quadrature signals will generate both phase shifts and amplitude variations at the same time [Ref]. To ease the phase detection and self-healing, a limiter can be added at the output of each phase rotator to eliminate the amplitude variation between the output signals. As illustrated in the embodiment shown in FIG. 6 and FIG. 7, limiters are provided. In another embodiment, a single limiter can be used to control one of the output signals to be matched to the amplitude of the other output signal. However, the phase detection and self-healing method can still function without the limiter, if a more complicated mathematical calculation is implemented that takes the amplitude variation into account.

Figure 8:
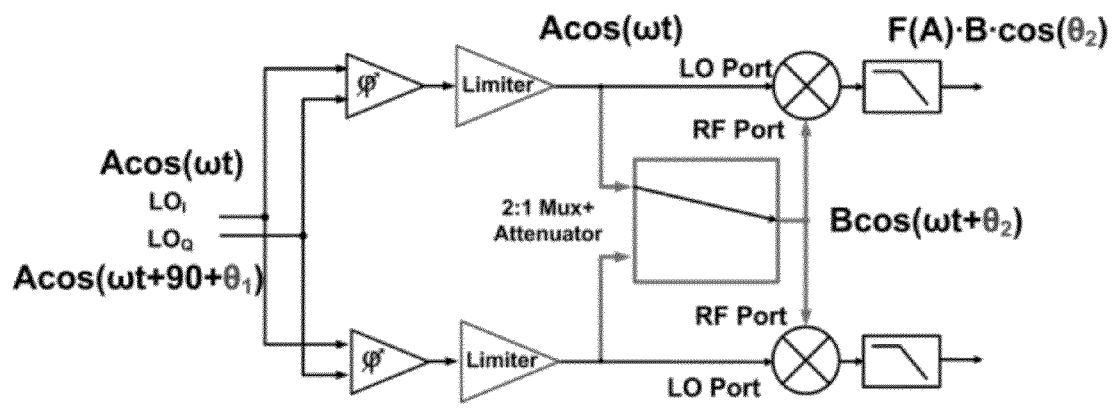
FIG. 8, FIG. 9 and FIG. 10 are diagrams that show steps in the calibration portion of the closed-loop phase correction operation using the auto-correcting phase-synthesis blocks.
Figure 9:
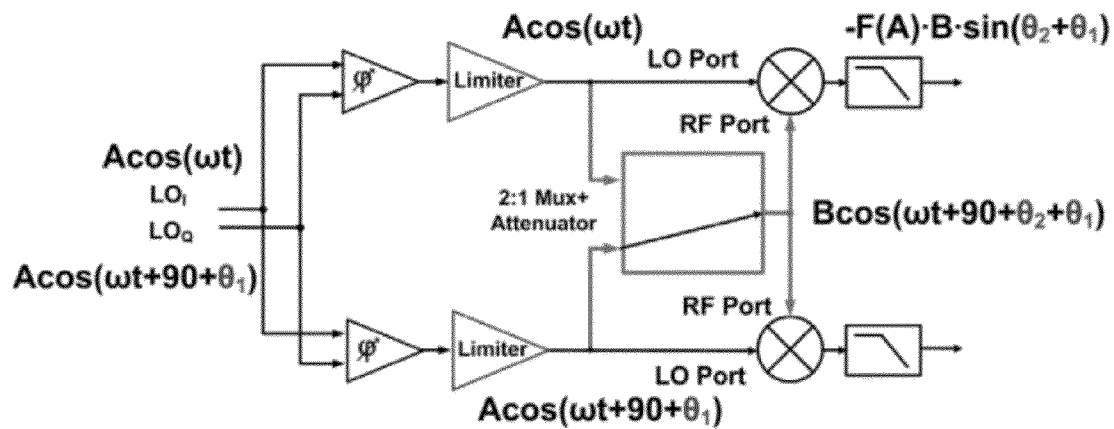
Figures 10, 11, 12:
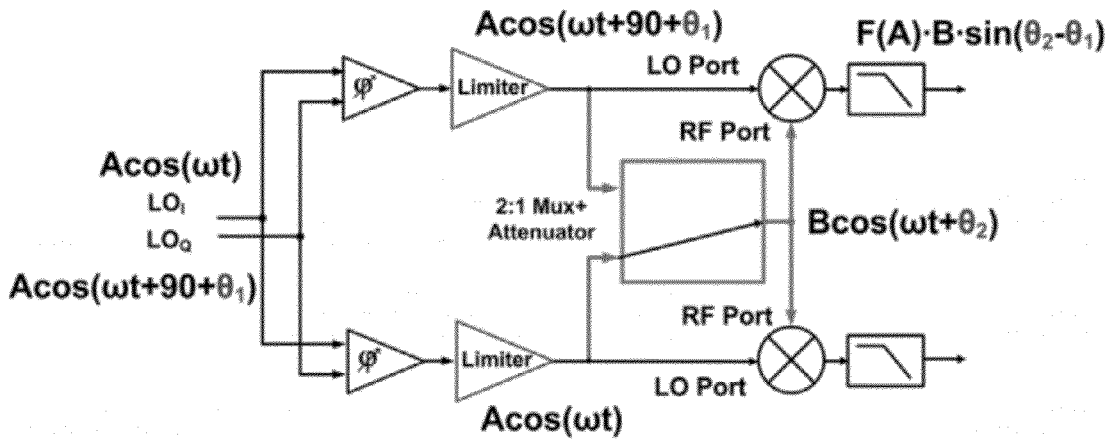
FIG. 11 and FIG. 12 illustrate relations used to solve for $\theta_1$ and $\theta_2$.

FIG. 8, FIG. 9 and FIG. 10 are diagrams that show steps in the calibration portion of the closed-loop phase correction operation using the auto-correcting phase-synthesis blocks. In the calibration operation, the I/Q imbalance (represented by $\theta_1$) and the physical delay of the multiplexer (mux)/attenuator (represented by $\theta_2$) are estimated based on self-mixing (I×I or Q×Q) and inter-mixing (I×Q) the non-ideal quadrature LO signals.

As illustrated in FIG. 8, in the first of three calibration steps, the I path phase rotator 1 (PRO is set to be all I (no Q), and we perform self-mixing using the 2:1 mux. Because the Q path signal is not used, its state is unimportant, and the Q path phase rotator (PR2) can be set to anything.

As illustrated in FIG. 9, in the second of three calibration steps, the I path phase rotator 1 (PRO is set to be all I (no Q), and the Q path phase rotator (PR2) is set to be all Q (no I), and we perform intermixing of the two signals.

As illustrated in FIG. 10, in the last of three calibration steps, the I path phase rotator 1 (PRO is set to be all Q (no I), and the Q path phase rotator (PR2) is set to be all I (no Q), and we perform intermixing of the two signals.

The values of $\theta_1$ and $\theta_2$ are determined using the relationships illustrated in FIG. 11 and FIG. 12. Since the I/Q phase imbalance $\theta_1$ is in the range of $-90<\theta_1<90$, $\theta_1$ has a unique solution given by the relation in FIG. 11, in which the circled numerals represent the values measured in the ordinal step represented by the same numeral. Given that the mux is of $1^{st}$ order, $\theta_2$ has a unique solution in the range $0<74_2<90$. Since $\theta_2 \approx 20$ at f=6 GHz, dividing $F(A) \cdot B \cdot \cos(\theta_2)$ is numerically stable. In an alternative embodiment, one can extract $\theta_2$ by fitting instead of calculating by the equation in FIG. 12.

Then, the interpolated phase shift $\theta x(i,j)$ for a particular phase rotator setting (i,j) is determined by solving the three equations represented by FIG. 8, FIG. 9 and FIG. 10.

In one embodiment, once all the rotator settings are swept, a complete 360° phase lookup table is generated. The required setting for the target phase shift can be easily determined from the lookup table. Chopping is employed in the mux/attenuator to remove the DC offsets since all outputs of the correction steps are DC voltages (mixing two signals with the same frequency). An automatic gain control (AGC) loop is also used to set the I/Q LO amplitudes at a desired level.

Figure 13:
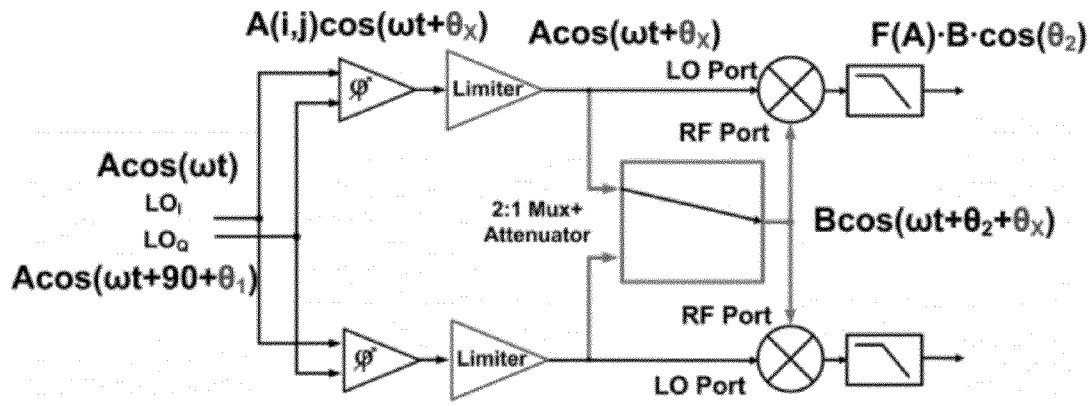
FIG. 13, FIG. 14, and FIG. 15 illustrate a three step measurement process that is performed to sense phase amplitude.
Figure 14:
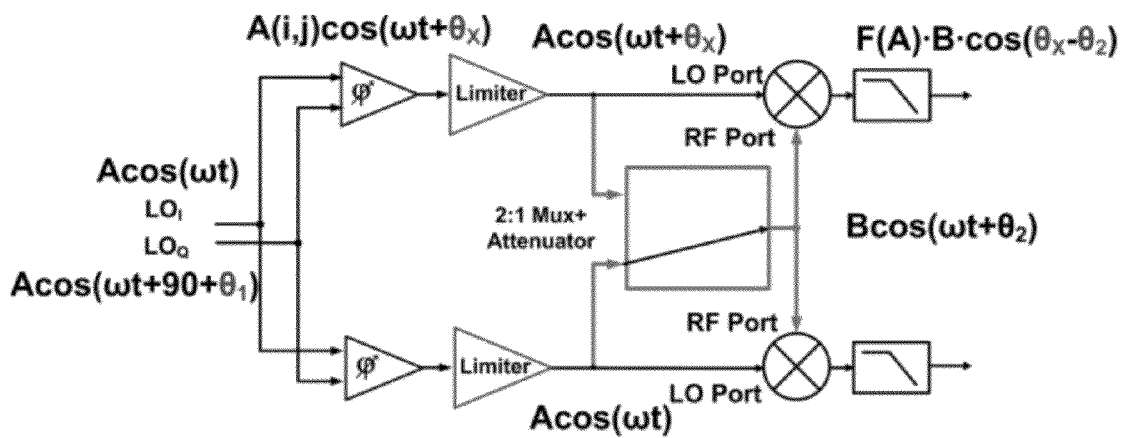
Figure 15:
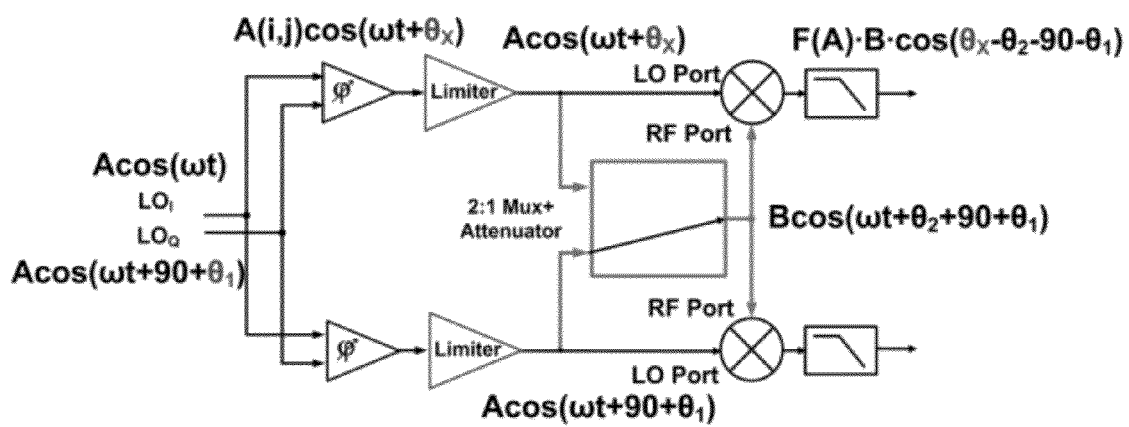

The phase amplitude sensing is then performed in a three step measurement process as illustrated in FIG. 13, FIG. 14, and FIG. 15. Referring to FIG. 13, we take it that a setting (i,j) gives a synthesized LO of A(i,j) and $\theta_x$. In general, $\theta_x$ is a function of (i,j) and (p,q).

As illustrated in FIG. 13, in the first of three measurement steps, the I path phase rotator 1 (PR1) is set to be (i,j), and we perform self-mixing using the 2:1 mux. Because the Q path signal is not used, its state is unimportant, and the Q path phase rotator (PR2) can be set to anything.

As illustrated in FIG. 14, in the second of three measurement steps, the I path phase rotator 1 (PR1) is set to be (i,j), and the Q path phase rotator (PR2) is set to be all I (no Q), and we perform intermixing of the two signals.

As illustrated in FIG. 15, in the last of three measurement steps, the I path phase rotator 1 (PR1) is set to be all Q (i,j), and the Q path phase rotator (PR2) is set to be all Q (no I), and we perform intermixing of the two signals.

The values of $\theta_1$ and $\theta_2$ previously determined are used again. One can extract $F[A(i,j)]$ and $\theta_x$ by fitting.

Some of the sources of errors in the phase calibration caused by sensing can include delay mismatch between two phase interpolators, such as mismatches and PVT; phase errors due to mixer mixing, such as mismatches and PVT; DC detector errors, such as circuit output noise and A/D quantization noise; limiting amplifier amplitude errors, for example finite loop-gain; and error propagation due to reusing the extracted $\theta_1$ and $\theta_2$.

There can also be actuation errors, for example systematic phase errors due to finite phase interpolator bits (phase quantization error).

Figure 16A:
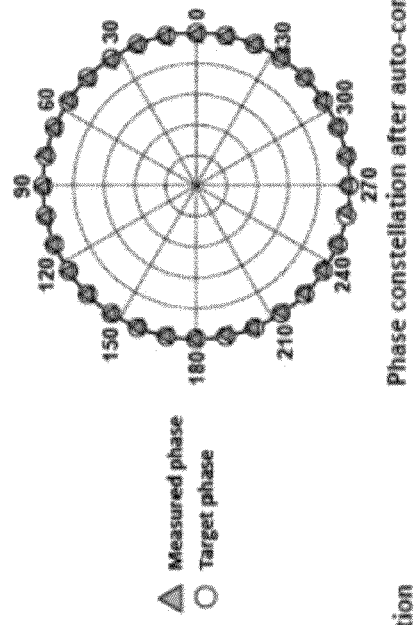
FIG. 16A is a diagram of the phase constellation before correction.
Figure 16B:
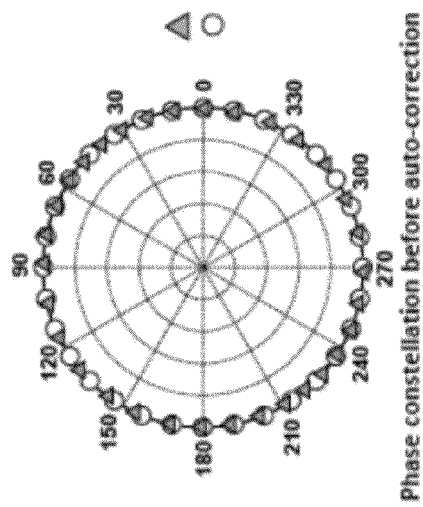
FIG. 16B is a diagram of the phase constellation after correction.
Figure 16C:
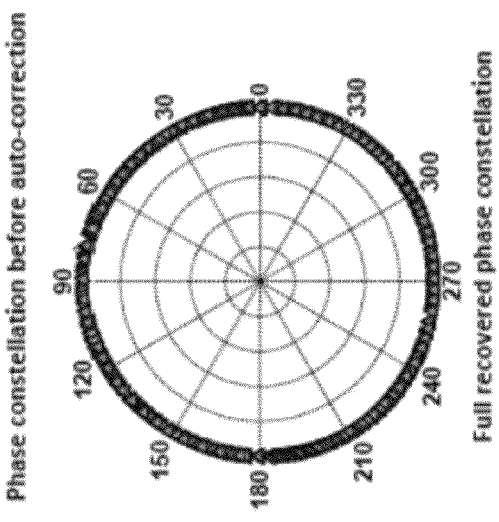
FIG. 16C is a diagram of the full constellation generated from all possible points from the 10-bit settings.
Figure 16D:
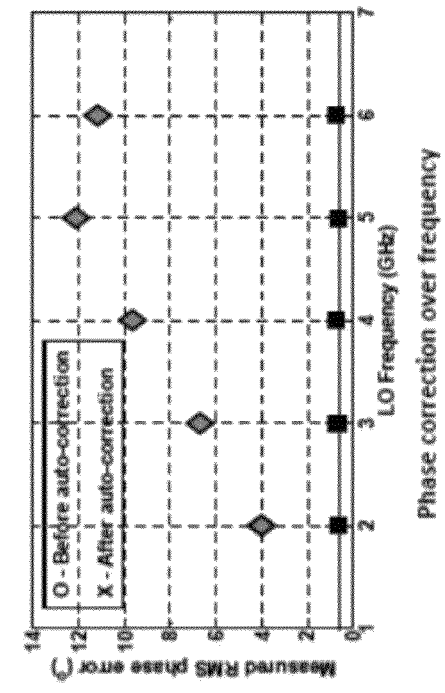
FIG. 16D is a graph illustrating phase correction over frequency for an embodiment of the invention.

FIG. 16A through FIG. 16D illustrate the measurement results obtained from the I-path phase rotator with the Q-path set at a fixed output phase as the reference. In one embodiment, the closed loop autonomous correction is performed off-chip through an ADC/FPGA interface. The phase constellation before correction, as illustrated in FIG. 16A, is significantly distorted from the ideal phase shifts by a 6.5° RMS phase error, due to the imbalance in the quadrature LO signals. However upon correction, as illustrated in FIG. 16B, the constellation contains phase points that match the required phases within a 0.7° RMS phase error. The full constellation generated from all possible points from the 10-bit settings is depicted in FIG. 16C. FIG. 16D is a graph that shows the measured corrected and uncorrected phase as a function of frequency.

In the embodiment illustrated, the dense constellation provides phases with an RMS quantization error of 0.66° for a continuous 360° phase interpolation. The on-chip IQ mismatches also vary significantly with frequency. The measurement results show that despite significant IQ mismatches, the auto-correcting phase synthesis is able to heal the phase within a 0.7° accuracy over the required 2-6 GHz frequency range for the embodiment presented. The correction accuracy is ultimately determined by the sensitivity of the self-mixing DC output detection.

We now describe in greater detail the construction and operation of specific embodiments of the self healing circuit of the invention.

Figure 17:
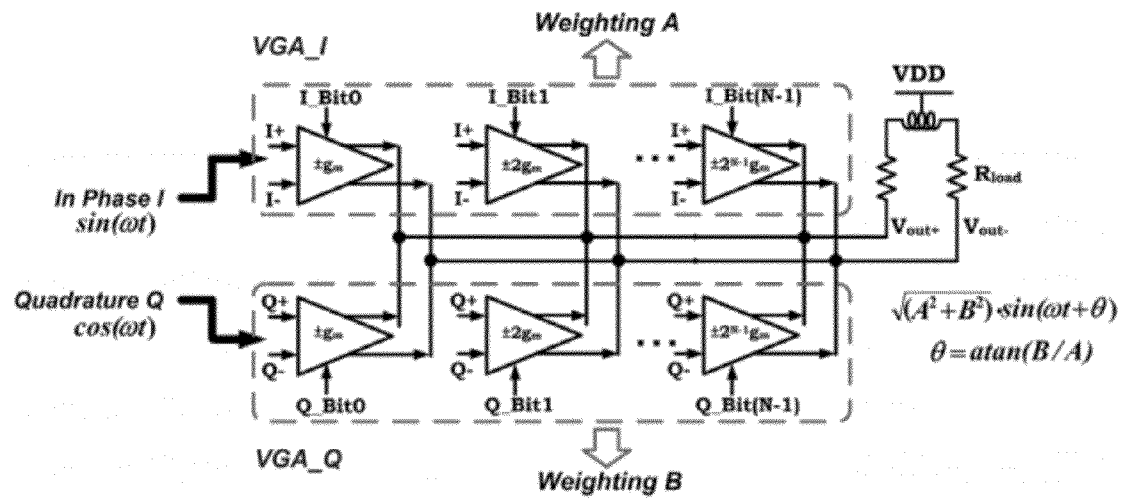
FIG. 17 is a schematic diagram of a 10 bit phase rotator.

FIG. 17 is a schematic diagram of a 10 bit phase rotator. Each unit $g_m$ cell is a polarity selector, which leads to a VGA gain that is PVT independent. The VGA gain depends on matching, and can be improved by design/layout techniques. The use of binary weighted unit cells provides a digital-linear gain interpolation. The gain can be well controlled and can be determined a priori.

Figure 18:
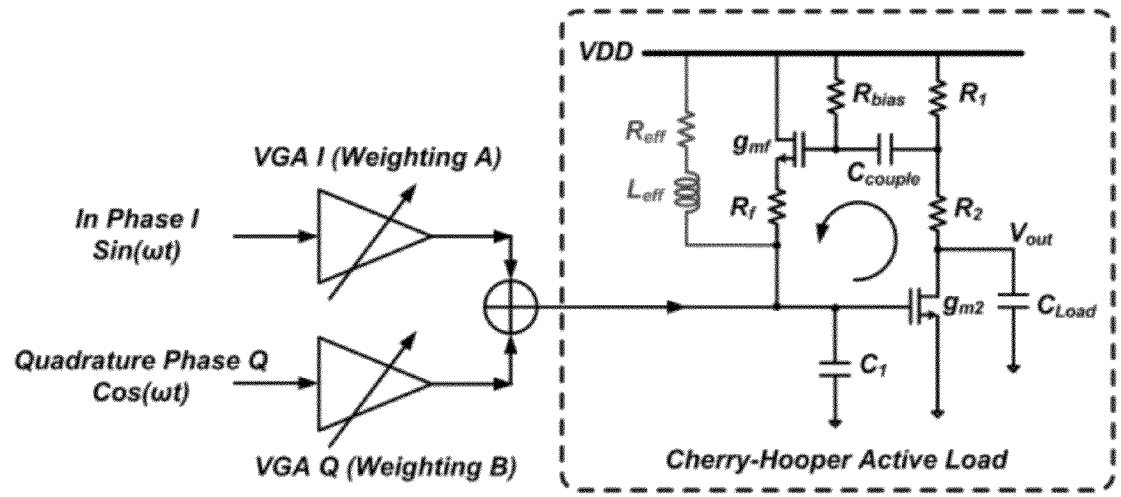
FIG. 18 is a circuit diagram that shows a Cherry-Hooper active load.

FIG. 18 is a circuit diagram that shows a Cherry-Hooper active load embodiment. The Cherry Hooper active load can provide synthetic inductive peaking. The low impedance at the current summing node is advantageous for bandwidth extension.

Figure 19:
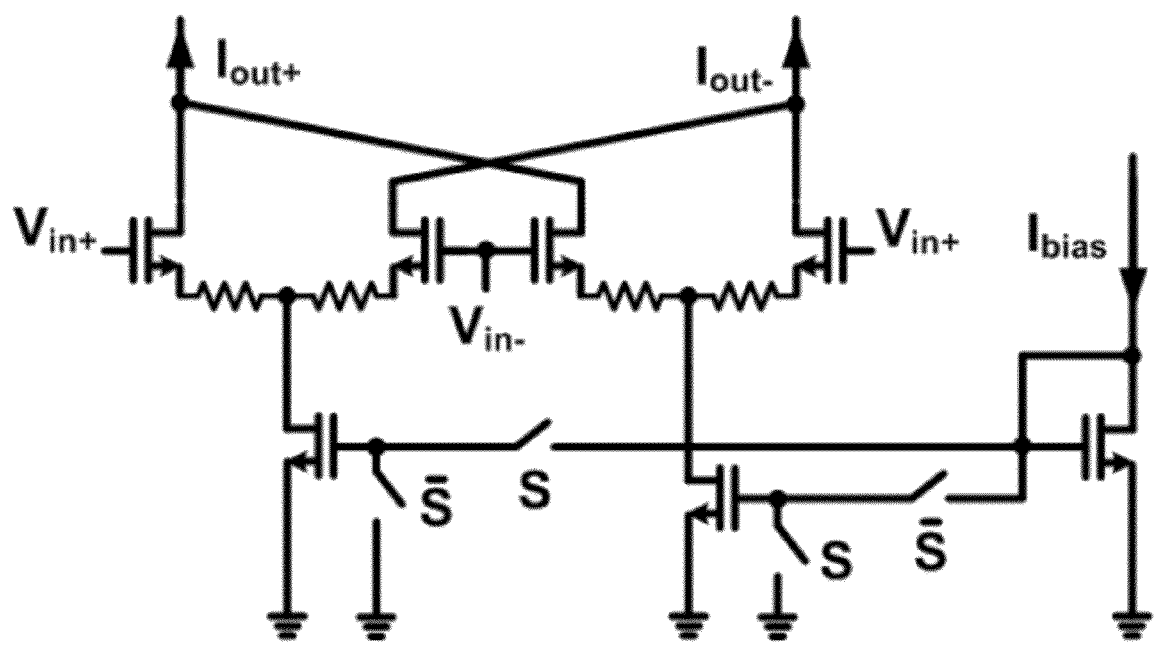
FIG. 19 is a circuit diagram showing an embodiment of a phase rotator unit cell.

FIG. 19 is a circuit diagram showing an embodiment of a phase rotator unit cell. The unit cell employs switches for polarity selection and resistive source degeneration for linearity improvement.

Figure 20:
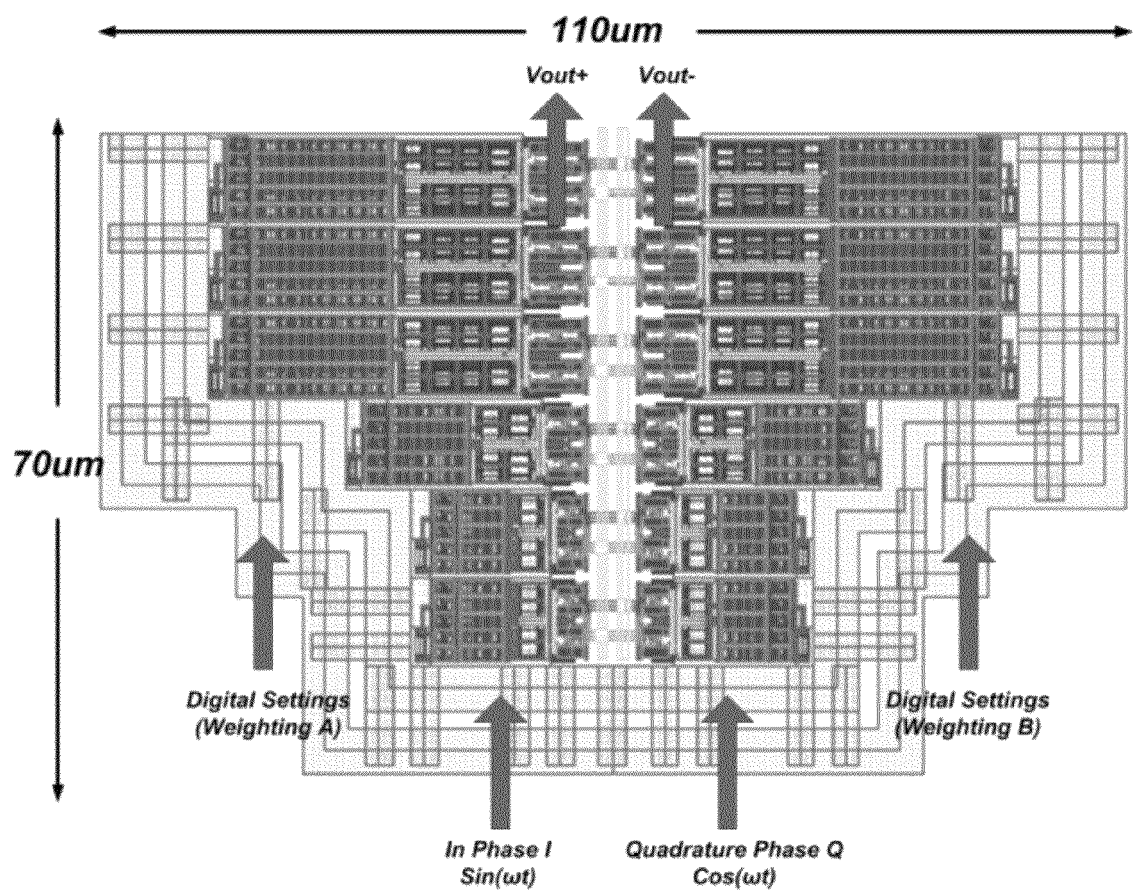
FIG. 20 is a diagram that illustrates the layout of a preferred embodiment of a 10-bit phase rotator.

FIG. 20 is a diagram that illustrates the layout of a preferred embodiment of a 10-bit phase rotator. The dimensions are 110 µm by 70 µm. The layout is a common-centroid layout using binary weighted cells. There is provided one Aux Bit0 to allow setting a true zero. The Bit3 elements are provided as two Bit2 elements in parallel to improve the differential nonlinearity of the phase rotator. Simulation of the operation of the phase rotator indicates that the DC gain equals 7.2 dB, and the −3 dB bandwidth is 10.7 GHz with a 60 fF single-ended load. Monte-Carlo simulation of the operation of the phase rotator indicates that for N=100, µ=0° and $\sigma_{74}$=0.94. This is a worst case analysis that shows that the mismatch in phase between the two phase rotators should be 0.94 °×$2^{0.5}$=1.33°.

Figure 21:
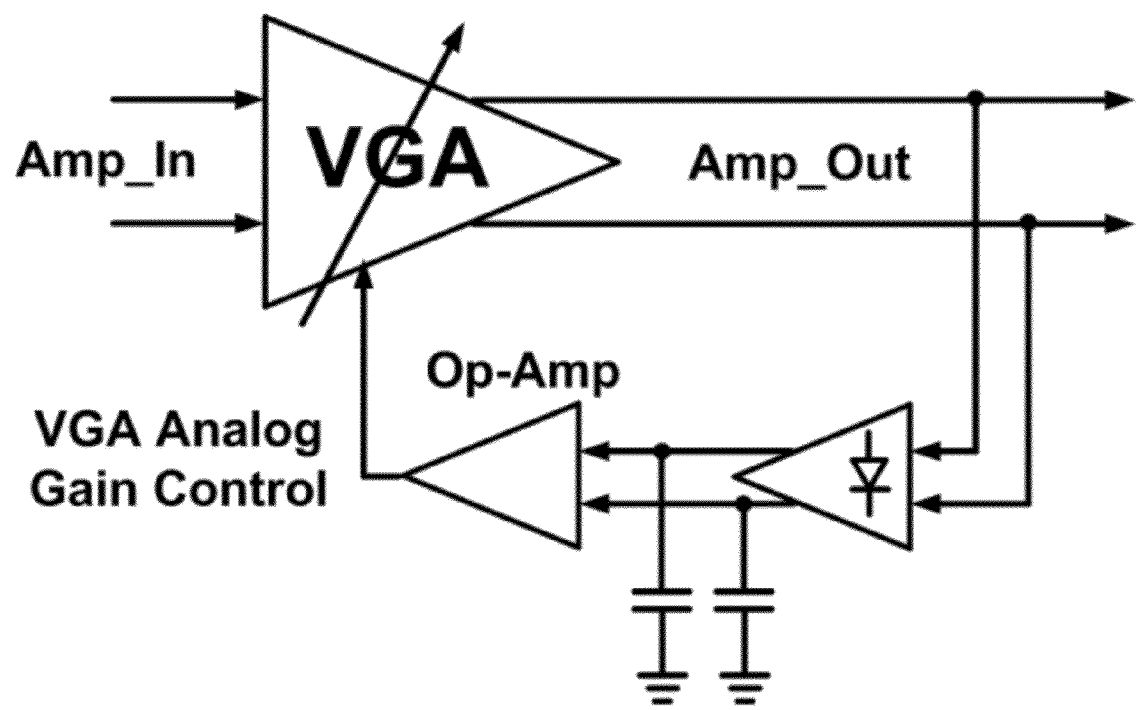
FIG. 21 is a schematic diagram of an embodiment of an amplitude regulator used in the phase synthesis network.

FIG. 21 is a schematic diagram of an embodiment of an amplitude regulator used in the phase synthesis network. Some of the design criteria that were used include preservation of the sine-wave shape of the LO; an LO amplitude that is 300 mV single-ended; providing a regulator with high gain to ensure regulating A(i,j) to A; and providing a VGA that has constant phase shift for different gain settings.

Figure 22:
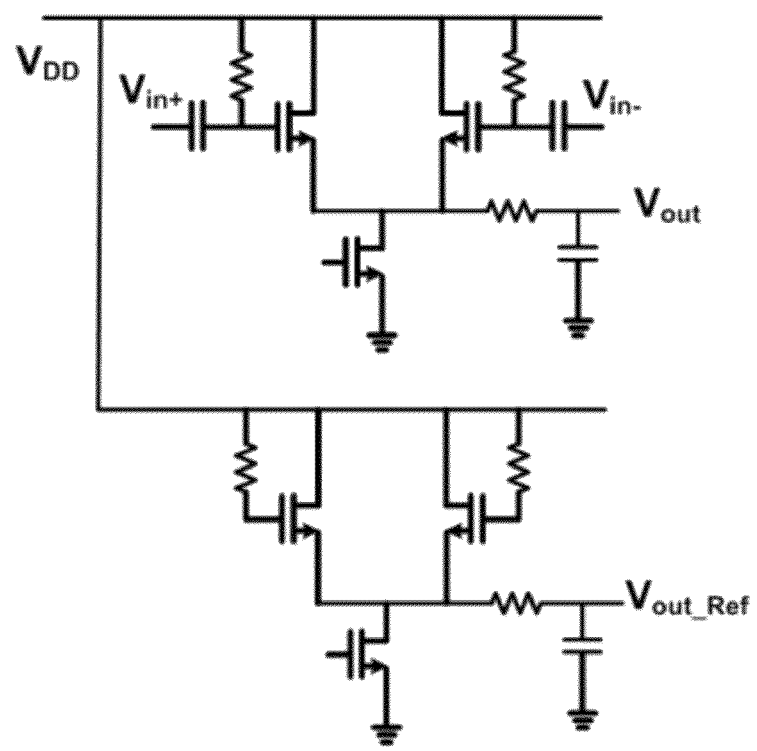
FIG. 22 is a schematic circuit diagram of an embodiment of a power sensor used in the phase synthesis network.

FIG. 22 is a schematic circuit diagram of an embodiment of a power sensor used in the phase synthesis network. The power sensor is used to extract the amplitude of the LO before the IF mixer.

Figure 23:
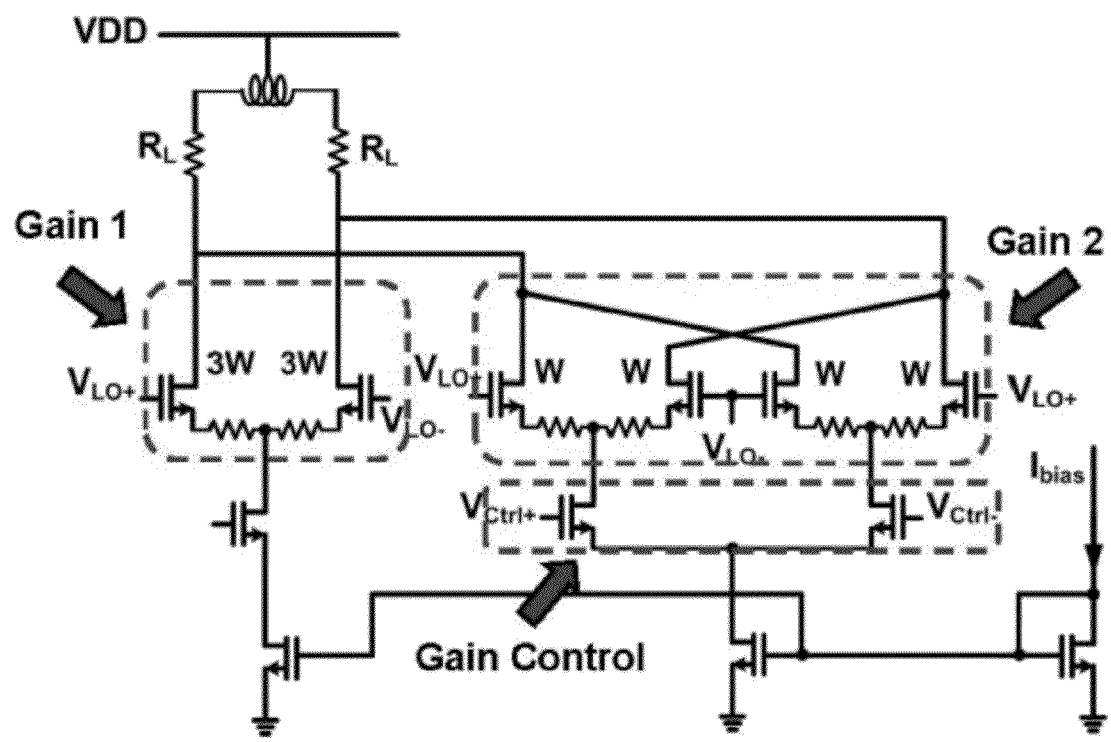
FIG. 23 is a schematic circuit diagram of an embodiment of a VGA used in the phase synthesis network.

FIG. 23 is a schematic circuit diagram of an embodiment of a VGA used in the phase synthesis network. The VGA comprises a current steering gain control. The voltage gain varies from 2 $g_m R_L$ to 4 $g_m R_L$, and is continuously tunable for 6 dB. Simulation of the VGA indicates that a variable voltage gain of 5.2 dB is available, with a maximum phase change of 1.1° over this range.

Figure 24:
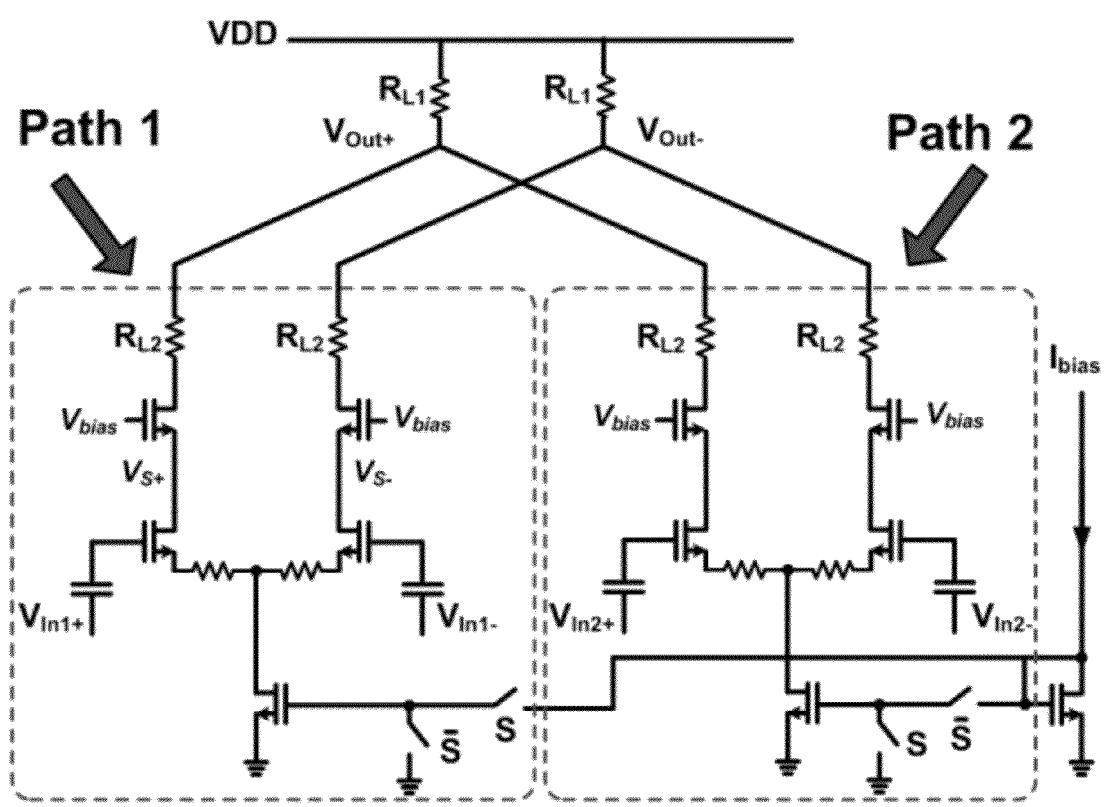
FIG. 24 is a schematic circuit diagram of an embodiment of a 2:1 multiplexer and attenuator used in the phase synthesis network.

FIG. 24 is a schematic circuit diagram of an embodiment of a 2:1 mux and attenuator used in the phase synthesis network. The circuit uses current communication for 2:1 multiplexing, cascode topology to improve isolation, and resistive degeneration for linearity improvement. Simulation suggests that the gain variation is smaller than 0.5 dB over the range of 2~6 GHz, and that the isolation between the two inputs is better than 80 dB.

Figure 25:
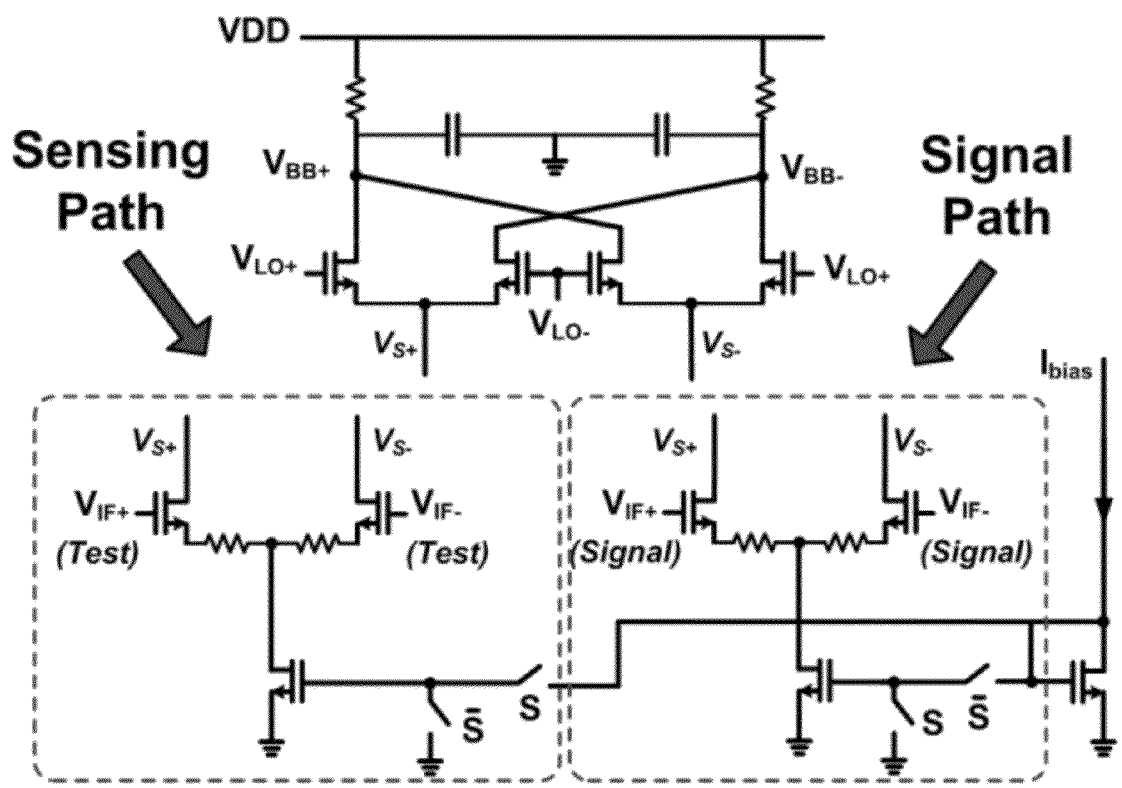
FIG. 25 is a schematic circuit diagram of an embodiment of an IF mixer used in the phase synthesis network.

FIG. 25 is a schematic circuit diagram of an embodiment of an IF mixer used in the phase synthesis network. The IF mixer comprises a double balanced mixer using Gilbert cells. Two matched RF paths are used, one for the actual RF signal and the other for phase sensing. Resistive degeneration is used for linearity improvement. Simulation suggests that the −3 dB bandwidth is 540 MHz, and that the 1 dB differential compression point at −5.5 dBV is 530 mV.

Figure 26:
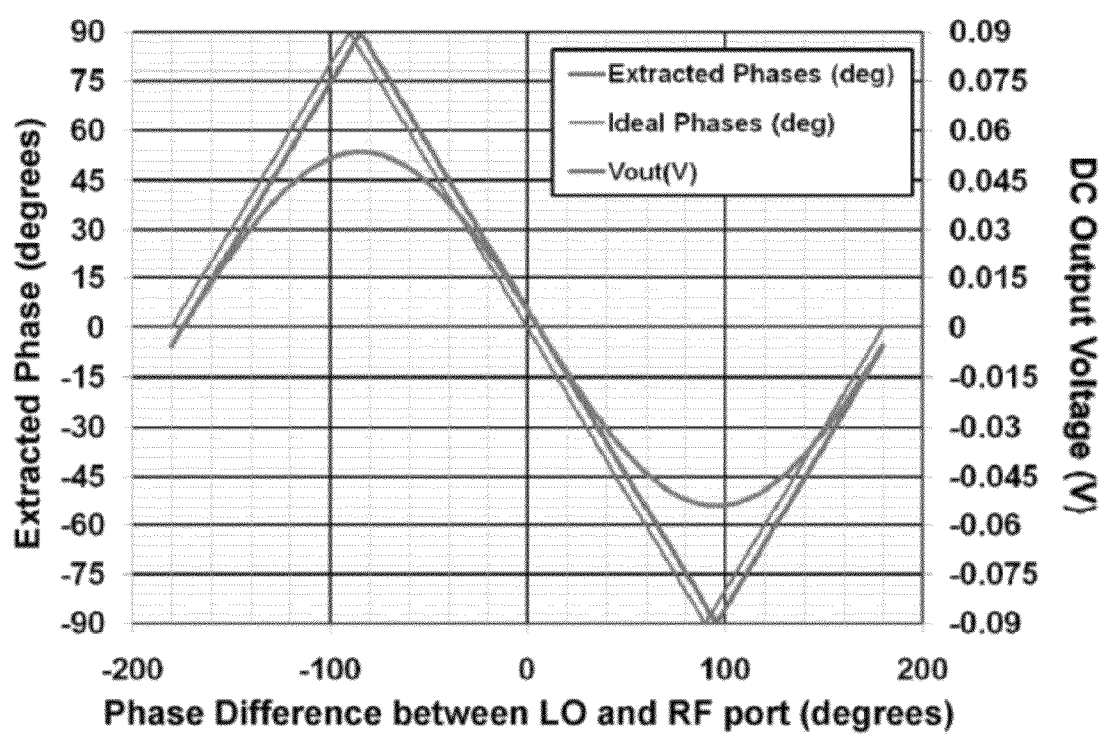
FIG. 26 is a graph of a simulation of the ideal phase relation between the LO and RF ports, the extracted phase relation between the LO and RF ports, and the mixer DC output voltage.

FIG. 26 is a graph of a simulation of the ideal phase relation between the LO and RF ports, the extracted phase relation between the LO and RF ports, and the mixer DC output voltage. The ideal phase relation is the linear plot that passes through the point 0°, 0° at the center of the plot. The extracted phase relation shows an offset of 5.6° phase offset, which is substantially constant over the entire −180° to +180° range. Since one can subtract out a constant offset, only the remaining phase error is of concern. Here, the phase error appears to be below 0.3°. The mixer output voltage is represented by the sinusoid.

Definitions

Recording the results from an imaging operation or image acquisition, such as for example, recording results at a particular wavelength, is understood to mean and is defined herein as writing output data to a storage element, to a machine-readable storage medium, or to a storage device. Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example an imaging or image processing algorithm coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein, so long as at least some of the implementation is performed in hardware.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A phase synthesis network having self healing capability, comprising:
    two input terminals configured to receive respectively an in-phase signal and a quadrature signal;
    two phase rotators, each configured to receive a respective one of said in-phase signal and said quadrature signal from said input terminals, each of said phase rotators having an input configured to receive a digital control signal, and configured to adjust a phase and a gain of said phase rotator in response to said digital control signal, each of said phase rotators having an output terminal configured to provide a respective output signal;
    a switch configured to receive each of said respective output signals from said phase rotators and configured to provide at an output terminal a selected one of said respective output signals as output for mixing with a predetermined one of said respective output signals;
    two mixers, each configured to receive a signal from a respective one of said output terminals of said phase rotators, each configured to receive an RF signal, each configured to receive an output signal from said output terminal of said switch, each configured to mix said received signals, and each having an output terminal configured to provide a mixed output signal;
    two analog-to-digital converters, each analog-to-digital converter configured to receive a respective one of said mixed output signal and to provide a respective digital signal in response thereto;
    a baseband digital processor configured to receive said two digital signals from said two analog-to-digital converters, and to generate a respective digital control signal, said digital control signals provided as control signals to a respective one of said phase rotator input configured to receive said digital control signal; and
    at least one output terminal configured to provide an output signal representative of said RF signal.

2. The phase synthesis network having self healing capability of claim 1, wherein at least one of said phase rotators is a 10-bit phase rotator.

3. The phase synthesis network having self healing capability of claim 2, wherein at least one of said phase rotators comprises a Cherry-Hooper active load.

4. The phase synthesis network having self healing capability of claim 2, wherein at least one of said phase rotators comprises an auxiliary Bit0 configured to allow a true zero to be set.

5. The phase synthesis network having self healing capability of claim 1, wherein said switch is a 2:1 multiplexer.

6. The phase synthesis network having self healing capability of claim 1, wherein at least one of said two mixers comprises a Gilbert cell.

7. The phase synthesis network having self healing capability of claim 1, wherein at least one of said two mixers comprises two matched RF paths.

8. The phase synthesis network having self healing capability of claim 1, further comprising a memory configured to contain a lookup table.

9. The phase synthesis network having self healing capability of claim 1, further comprising at least one limiter configured to control an amplitude of an output signal of one of said two phase rotators to match an amplitude of an output signal of the other of said two phase rotators.

10. A method of self-healing a radio-frequency circuit, comprising the steps of:
    providing a phase synthesis network having self healing capability, said phase synthesis network in electrical communication with a radio-frequency circuit of interest, said phase synthesis network comprising:
        two input terminals configured to receive respectively a first signal representative of an in-phase signal and a second signal representative of a quadrature signal;
        two phase rotators, each configured to receive a respective one of said first signal and said second signal from said input terminals, each of said phase rotators having an input configured to receive a digital control signal, and configured to adjust a phase and a gain of said phase rotator in response to said digital control signal, each of said phase rotators having an output terminal configured to provide a respective output signal;
        a switch configured to receive each of said respective output signals from said phase rotators and configured to provide at an output terminal a selected one of said respective output signals as output for mixing with a predetermined one of said respective output signals;

two mixers, each configured to receive a signal from a respective one of said output terminals of said phase rotators, each configured to receive an RF signal, each configured to receive an output signal from said output terminal of said switch, each configured to mix said received signals, and each having an output terminal configured to provide a mixed output signal;

two analog-to-digital converters, each analog-to-digital converter configured to receive a respective one of said mixed output signal and to provide a respective digital signal in response thereto;

a baseband digital processor configured to receive said two digital signals from said two analog-to-digital converters, and to generate a respective digital control signal, said digital control signals provided as control signals to a respective one of said phase rotator input configured to receive said digital control signal; and at least one output terminal configured to provide an output signal representative of said RF signal;

observing a response of said phase synthesis network to an input signal;

extracting one or more operational parameters of said phase synthesis network;

calculating a corrective action to bring one or more operational parameters of said phase synthesis network within a desired range, and recording said corrective action in a memory; and applying said calculated corrective action to said phase synthesis network so as to self-heal at least one of said one or more operational parameters of said phase synthesis network.

11. The method of self-healing a radio-frequency circuit of claim 10, further comprising the step of checking at least one operational parameter of said phase synthesis network after said calculated corrective action is applied.

12. The method of self-healing a radio-frequency circuit of claim 10, wherein said steps of extracting one or more operational parameters of said phase synthesis network, calculating a corrective action, and applying said calculated corrective action are repeated iteratively.

13. The method of self-healing a radio-frequency circuit of claim 10, wherein said input signal is a signal having a first signal representative of an in-phase signal and a second signal representative of a quadrature signal.

14. The method of self-healing a radio-frequency circuit of claim 10, wherein said step of extracting one or more operational parameters of said phase synthesis network comprises extracting a selected one of a phase mismatch and a delay mismatch.

15. The method of self-healing a radio-frequency circuit of claim 10, wherein said step of calculating a corrective action comprises calculating a digital signal configured to adjust an operating parameter of a respective one of said two phase rotators.

16. The method of self-healing a radio-frequency circuit of claim 10, wherein said step of recording said corrective action in a memory comprises building a lookup table.

17. The method of self-healing a radio-frequency circuit of claim 10, wherein said step of applying said calculated corrective action to said phase synthesis network comprises setting the operation of a respective one of said two phase rotators by providing said digital control signal to said respective input configured to receive said digital control signal.

* * * * *